US008957892B2

(12) United States Patent
Neuman et al.

(10) Patent No.: US 8,957,892 B2
(45) Date of Patent: Feb. 17, 2015

(54) STEREO COMPOSITION BASED ON MULTIPLE CAMERA RIGS

(75) Inventors: Robert M. Neuman, Santa Clara, CA (US); Dmitriy V. Pinskiy, Encino, CA (US); Henry Driskill, Valencia, CA (US); Joseph W. Longson, Castaic, CA (US)

(73) Assignee: Disney Enterprises, Inc., Burbank, CA (US)

( * ) Notice: Subject to any disclaimer, the term of this patent is extended or adjusted under 35 U.S.C. 154(b) by 325 days.

(21) Appl. No.: 13/589,357

(22) Filed: Aug. 20, 2012

(65) Prior Publication Data

US 2014/0049536 A1 Feb. 20, 2014

(51) Int. Cl.
*G06T 15/00* (2011.01)

(52) U.S. Cl.
USPC .......................................................... 345/419

(58) Field of Classification Search
CPC ...... G06T 15/20; G06T 7/0065; G06T 7/0097; G06T 2207/10012; H04N 13/0239; H04N 5/2224
USPC .......................................................... 345/419
See application file for complete search history.

(56) References Cited

U.S. PATENT DOCUMENTS

| | | | |
|---|---|---|---|
| 5,877,779 A | 3/1999 | Goldberg | |
| 6,466,185 B2 | 10/2002 | Sullivan et al. | |
| 6,583,787 B1 | 6/2003 | Pfister et al. | |
| 6,677,939 B2 | 1/2004 | Uchiyama | |
| 7,088,361 B2 | 8/2006 | Boekhorst | |
| 7,133,041 B2 | 11/2006 | Kaufman et al. | |
| 7,227,526 B2 | 6/2007 | Hildreth et al. | |
| 7,233,332 B2 | 6/2007 | Lokovic et al. | |
| 7,894,662 B2 | 2/2011 | Bushell et al. | |
| 7,898,522 B2 | 3/2011 | Hildreth et al. | |
| 8,228,327 B2 | 7/2012 | Hendrickson et al. | |
| 2001/0016082 A1 | 8/2001 | Ichimura | |
| 2005/0089213 A1* | 4/2005 | Geng | 382/154 |
| 2009/0219283 A1* | 9/2009 | Hendrickson et al. | 345/420 |

OTHER PUBLICATIONS

Debevec, Paul E., "Modeling and Rendering Architecture from Photographs: A hybrid geometry-and image-based approach," Computer Graphics Proceedings, Annual Conference Series, 1996, XP 000682717, University of California at Berkeley, Aug. 4, 1996.

(Continued)

*Primary Examiner* — Kee M Tung
*Assistant Examiner* — Haixia Du
(74) *Attorney, Agent, or Firm* — Marsh Fischmann & Breyfogle LLP; Kent A. Lembke

(57) ABSTRACT

A method for performing stereo composition using multiple camera pairs. The method includes positioning first and second pairs of virtual cameras for imaging an animated scene. The method includes, with the first and second pairs of the cameras, obtaining 3D data for each camera for the animated scene. Then, a blending region is selected by defining a first boundary surface for the first pair of the cameras and a second boundary surface, spaced a distance apart from the first boundary surface, for the second pair of the cameras, with the blending region being the space between the first and second boundary surfaces. The method includes, with a blending module or function, combining the 3D data from a number of consequent cameras. The blending module monotonically increases the stereoscopic disparity function in a viewing direction and combines the 3D data in a continuous manner, e.g., to insure C1 continuity.

14 Claims, 8 Drawing Sheets

(56) References Cited

OTHER PUBLICATIONS

Examination Report, EP Appl. No. 09716811.6, Applicant, Disney Enterprises, Inc. dated Mar. 16, 2011, European Patent Office.
Feldmann, I., Nonlinear Depth Scaling for Immersive Video Applications, Proceedings of 4th International Workshop on Image Analysis for Multimedia Interactive Service (WIAMIS 2003). London, UK pp. 433-438, Apr. 2003.
European Patent Office, Munich Germany, Examination Report for Application No. 09716811.6-2218 ,dated Mar. 30, 2012.
Farell "Orientation-Specific Computation in Stereoscopic Vision." Published 2006.
Bleyer et al. "A layered stereo matching algorithm using image segmentation and global visibility constraints." Published 2004.
Popescu et al. Three-Dimensional Display Rendering Acceleration Using Occlusion Camera Reference Images. Published 2005.
Holliman, Nick, "Mapping Perceived depth to regions of Interest in Stereoscopic Images" Stereoscopic Displays and Virtual Reality Systems, XI, Jan. 19-22, 2004, San Jose, CA, XP-002526373, pp. 117-128.
Holliman, Nick, "Smoothing Region Boundaries in Variable Depth Mapping for Real Time Stereoscopic Image," Stereoscopic Displays and Virtual Reality Systems XII, Jan. 17, 2005, San Jose, CA, XP-002526374, pp. 281-292.
Holliman, Nick, et al., "Cosmic Cookery: Making a Stereoscopic 3D animated Movie," Jan. 27, 2006, XP-002526375.
Jones, Graham, et al., Controlling Perceived Depth in Stereoscopic Images, Proceedings of SPIE vol. 4297 (Jan. 22, 2001) XP8016209, pp. 42-53.
Spottiswoode et al., "Basic Principles of the Three-Dimensional Film," Oct. 1952, Journal of the SMPTE, vol. 59, pp. 249-286.
International Search Report, PCT/US2009/034005, sent Sep. 16, 2009.

* cited by examiner

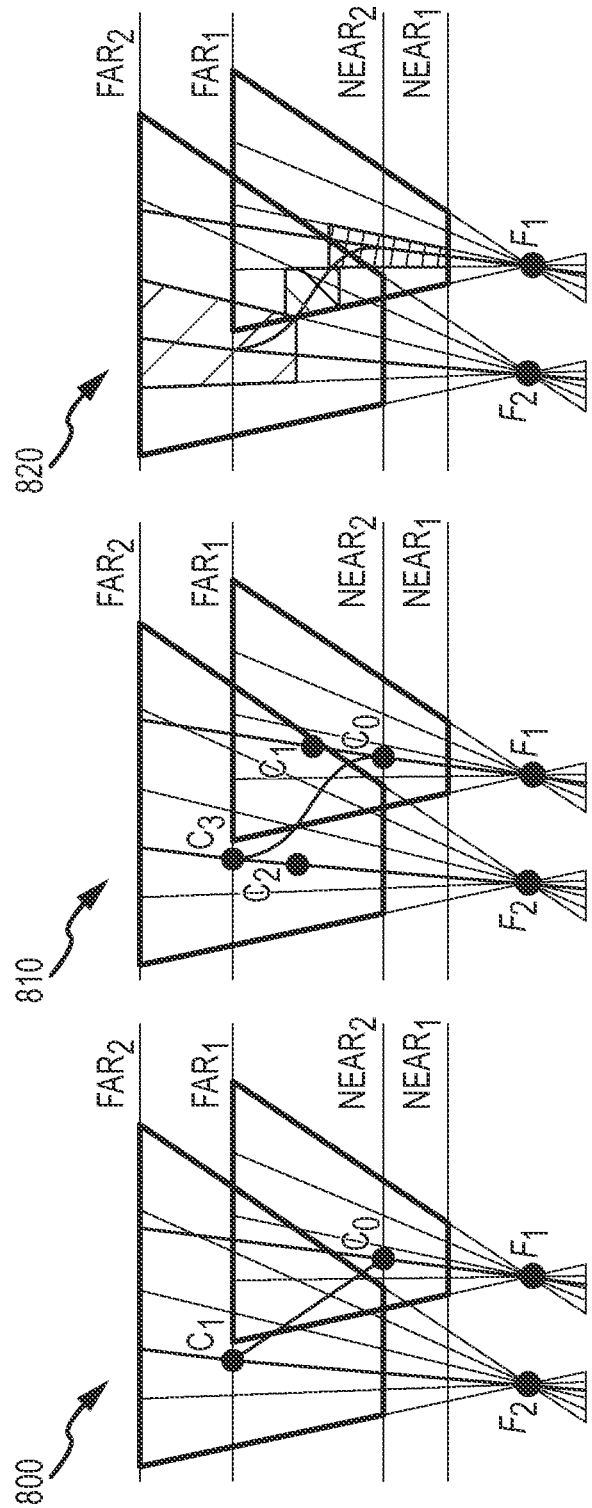

STEREO COMPOSITION BASED ON MULTIPLE CAMERA RIGS

BACKGROUND

1. Field of the Description

The present description relates, in general, to stereoscopic or three dimensional (3D) image generation, and, more particularly, to systems and methods for producing stereoscopic images or 3D content. The described systems and methods are useful for providing 3D content with images being generated with enhanced depth rendering, without discontinuities or other artifacts being produced during compositing, for objects or scene elements at differing depths (e.g., such enhancements may include use of camera settings or parameters that are set differently for foreground characters and for background scene elements).

2. Relevant Background

Computer animation has become a standard component in the digital production process for animated works such as animated films, television animated shows, video games, and works that combine live action with animation. The rapid growth in this type of animation has been made possible by the significant advances in computer graphics (CG) software and hardware that is utilized by animators to create CG images. Producing computer animation generally involves modeling, rigging, animation, and rendering. First, the characters, elements, and environments used in the computer animations are modeled. Second, the modeled virtual actors and scene elements can be attached to the motion skeletons that are used to animate them by techniques called rigging. Third, computer animation techniques range from key framing animation, where start and end positions are specified for all objects in a sequence, to motion capture, where all positions are fed to the objects directly from live actors whose motions are being digitized. Fourth, computer rendering is the process of representing visually the animated models with the aid of a simulated camera.

There is a growing trend toward using 3D projection techniques in theatres and in home entertainment systems including video games and computer-based displays. To render CG images for 3D projection (e.g., stereoscopic images), a pair of horizontally offset, simulated cameras is used to visually represent the animated models. More specifically, by using 3D projection techniques, the right eye and the left eye images can be delivered separately to display the same scene or images from separate perspectives so that a viewer sees three dimensional object positioning or a stereo setup, e.g., certain characters or objects appear nearer than the screen and others appear farther away than the screen. Stereoscopy, stereoscopic imaging, and 3D imaging are labels for any technique capable of retaining 3D visual information for producing the illusion of depth in an image. The illusion of depth in a photograph, movie, or other two-dimensional image is created by presenting a slightly different image to each eye. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames, with one or more object slightly offset, to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

With the recent growing surge in development and sale of 3D projection systems and devices, there is an increased demand for high quality stereoscopic images that provide high quality and pleasant viewing experiences. One challenge facing stereographers or 3D animators is how to create an aesthetically appealing image while avoiding the phenomenon of "cardboarding," which refers to a stereoscopic scene or image that appears to include a series of flat image planes arrayed at varying depths (e.g., similar to a pop-up book). Rendering of left and right eye images is generally performed using linear depth processing using ray casting or ray tracing techniques that involve following a straight line, through a given pixel, connecting objects, light sources, and the simulated stereo cameras. CG images rendered with linear depth variation throughout the scene provides a real world view, but such rendering can produce cardboarding due to various combinations of lens focal lengths selected for the cameras and staging of the scene being imaged by the cameras. For example, there are generally trade offs between a viewer's comfort (e.g., limiting parallax to acceptable ranges) and cardboarding problems.

Another problem that arises in the staging and later rendering of a stereoscopic image is wasted space. The storytelling space for a stereographer includes the screen plane (i.e., at zero pixel shift), screen space into or behind the screen, and theater space toward the viewer or audience from the screen plane. The theater space is used by creating crossed or negative parallax while the screen space is used by creating divergent or positive parallax in the stereoscopic images. The total display space may be measured in pixels and is often limited to less than about 70 pixels in total depth. Wasted space occurs when a long lens is used for the cameras or when a foreground figure is ahead of an object with a normal lens. In these cases, there often is a relatively large amount of depth (e.g., large percentage of the 70 available pixels) located between a foreground figure and objects or environment elements located behind the foreground figure or object. Thus, the objects cardboard due to the limited depth precision available to them.

Some efforts to eliminate or limit the wasted storytelling space have included multi-rigging or using multiple camera pairs for each or several select objects to give better depth or volume to the CG image. For example, one camera rig or pair may be focused on a foreground figure while another is focused on a background object, and the resulting CG image levels are composited or combined to form the final CG image. The result can be a better rounded foreground figure (e.g., more depth in foreground and less cardboarding), flatter background images (e.g., similar to that experienced by an observer of a real-life scene where objects that are farther away appear to have less volume), and less wasted space.

Complex animation shots are, therefore, often not limited to a single stereo setup or pair of cameras as this allows an animator to assign different stereo depths for different groups of objects. Such differing camera parameters and settings allow greater artistic flexibility and control over the 3D effect. These requirements or desires have been addressed by using multi-rigging, which involves separately rendering a modeled scene with different pairs of stereo cameras and then combining or compositing the separately rendered layers of images (or output of the pairs of stereo cameras) together to form a 3D image or animation shot.

Unfortunately, using multiple camera pairs often has proven to be relatively complex with compositing being a tedious process. Additionally, multi-rigging is not always a useful solution because it does not produce acceptable results if there is a physical connection between the two objects that are the focus of the camera pairs. If both objects are shown to be touching the ground, disconnects or unwanted visual artifacts are created during compositing and rendering of the CG image such as where the ground contacts one or both of the objects. Multi-rig techniques depend upon being able to divide the scene into non-interconnected image levels since the depth tailoring offered by this technique creates a discrete set of linear depth functions and does not allow for seamless transitions blending between the depth functions. In other words, multi-rigging may be limited to shots where there is no interconnecting flooring or base.

As a result of these issues, multi-rigging has important artistic limitations as it requires objects rendered with different stereo parameters or camera settings to be clearly separable such as with an empty space between them. There are presently no reliable and practical techniques for producing seamless and visually pleasing transitions between stereoscopic settings along the viewing direction. For example, if one simply composites the foreground and background stereo camera outputs of a multi-rig setup by removing the distance or space between these outputs, a visual discontinuity or other visually apparent or rough disconnect is present in the rendered or output stereoscopic image.

Further, in regard to use of multi-rigging, the main purpose of the multi-rigging technique is not so much to reduce the "waste" but to combine stereoscopic representation (i.e., assign a particular stereo depth to objects that are located at a given distance from the cameras). However, traditional stereo camera multi-rigging has the significant limitation in that there should be a gap between the portions of the scene. For example, if there is a ground plane, most likely one could not use traditional multi-rigging because it would be in both portions and the product would include artifacts (i.e., discontinuities).

SUMMARY

The following description addresses the above problems by providing stereo composition methods and systems for generating or rendering stereoscopic images using two or more camera pairs (to provide sets of left and right eye images and/or 3D data). The methods and systems allow a 3D animator or artist to define separate parameters or settings for each pair of cameras and to target differing portions of a shot or modeled scene with each camera pair, such as a first camera pair targeting a region in the foreground and a second camera pair targeting a region in the background. Each region is defined by boundaries (or surfaces) that are user definable, such as a plane that is a distance away from the cameras or a curved surface enclosing a foreground, midground, or background object or character.

The methods and systems then use a blending function to combine the input from the camera pairs (e.g., sets of 3D data from each of the left and right eye cameras), and the blending function is defined by one or more algorithms such that blending between the differing camera pair regions (e.g., to remove the space between regions) is smooth and monotonic. Smoothness is meant to describe a blending process that avoids discontinuities such as by using a blending function that is C0 continuous (i.e., linear) and, in some embodiments, is C1 continuous (i.e., non-linear/smooth). Believable or desirable stereoscopic visualization is produced by the blending function by taking into account the disparity function and causing this to be monotonically increasing in the viewing function (i.e., along the casting rays). This avoids problems with compositing of output of conventional multi-rig setups in which background images may actually appear to a viewer to be in front of a foreground image due to failure to preserve depth relationships as the compositing was not monotonic.

More particularly, a computer-based method is provided for performing stereo composition based on multiple camera rigs. The method includes positioning at least first and second pairs of offset, virtual cameras for imaging an animated scene (e.g., offset left and right cameras). The method also includes, with the first and second pairs of the cameras, obtaining three-dimensional (3D) data (e.g., volumetric data) for each of the cameras for the animated scene. Then, a blending region is provided or selected by defining a first boundary surface for the first pair of the cameras and a second boundary surface, spaced a distance apart from the first boundary surface, for the second pair of the cameras. In practice, the blending region is a space or volume in the animated scene between the first and second boundary surfaces. The method also then includes, with a blending module or function run by (or provided to cause operation of) a processor, processing the 3D data in the blending region to combine the 3D data from the first and second camera pairs.

In some embodiments, the method also includes rendering the combined 3D data to generate stereoscopic images. The animated scene may include an object extending across the first and second boundary surfaces (such as a base plane or flooring or a character/object moving between the two camera regions). Even with this extending object, the generated stereoscopic images are free of discontinuities in the object at transitions at the first and second boundary surfaces.

The blending module may be configured to monotonically increase the stereoscopic disparity function in a viewing direction during the processing of the 3D data. Further, the blending module may combine the 3D data associated with the first and second camera pairs in a continuous manner. For example, the blending module may provide C0 or, often, C1 continuity in the combined 3D data. The blending module may combine the 3D data by linearly blending, through the blending region, a 3D data set from each left camera of the first and second camera pairs and linearly blending a 3D data set from each right camera of the first and second camera pairs. The blending module may also or alternatively combine the 3D data using non-linear depth blending, through the blending region, a 3D data set from each left camera of the first and second camera pairs and non-linear depth blending a 3D data set from each right camera of the first and second camera pairs.

In some embodiments, the boundary surfaces may be offset planar surfaces (e.g., to define a foreground region for a first camera pair and to define a background region for a second camera pair). In other cases, though, the first boundary surface or the second boundary surface is non-planar (e.g., has a curved cross sectional shape). In some cases, the first boundary surface or the second boundary surface is configured to encapsulate an object in the animated scene, e.g., allows a camera pair to be used with camera settings suited for a particular object or character.

Some prior work involved use of non-linear depth rendering. This work was intended to reduce "waste" using a single stereo camera rig (e.g., a left mono camera plus a right mono camera). In contrast, the present description teaches set ups or systems with a multiplicity of stereo rigs. As a result, the user has much more freedom to create a shoot or 3D content and is provided more artistic control. For example, a user can prescribe a specific interocular distance for each portion of the scene.

BRIEF DESCRIPTION OF THE DRAWINGS

FIGS. 8A-8C illustrate graphs, similar to that of FIG. 7, showing differing blending functions or techniques for processing 3D data in the blending region to combine 3D data from two camera pairs or rigs for an animated scene.

DETAILED DESCRIPTION

Figure 1:
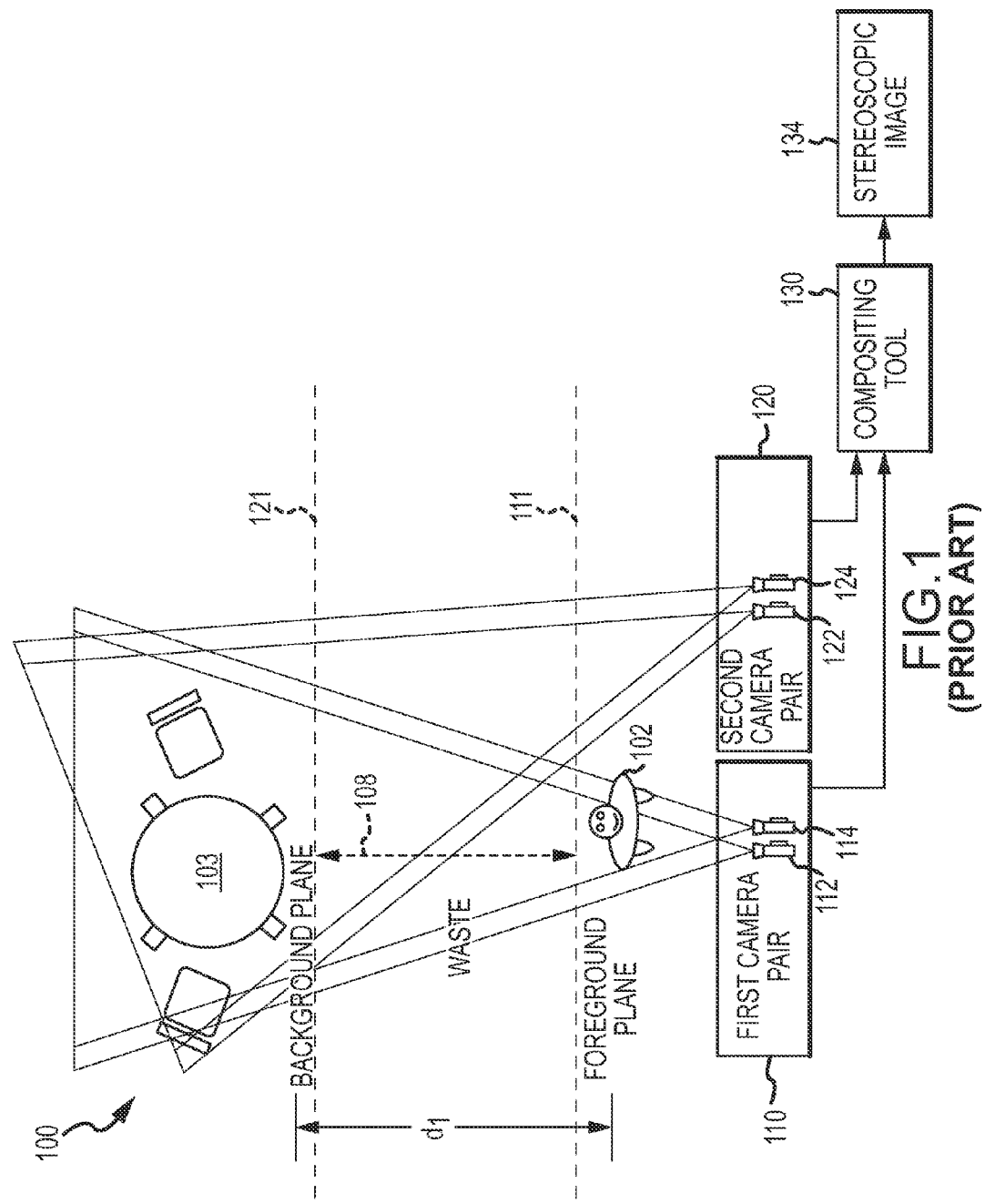
FIG. 1 illustrates a functional block drawing, in simplified form, of a system for using multi-rigging to produce a stereoscopic image.

Briefly, the following describes stereo composition methods and systems for generating left and right eye images (or frames) that are used in forming stereoscopic images (such as by projection via a polarizing filter or the like) in a 3D projection or display system. For example, the composition method may involve providing two or more camera pairs and setting the same or differing camera parameters or settings for each camera pair. Each camera pair may be assigned or used to capture 3D data for regions of a shot or scene, such as one camera pair having settings appropriate for a foreground object, while a second camera pair has settings more appropriate to background objects.

The 3D data of the two or more camera pairs is then combined using a blending function that is chosen to provide smooth blending of the 2 or more sets of 3D data and to also preserve depth. This is achieved using algorithms and/or processes in the composition engine or module (which implements the blending function or tool) that insure continuity or that blending is continuous (e.g., C0 or C1 continuity) and also monotonically increase the disparity function in the viewing direction. In some implementations, a 3D animator or artist is able to select a blending function (or approach to use) among several pre-defined blending processes and then to tune the selected blending function (e.g., to achieve a desired artistic or visual effect in a rendered stereoscopic image).

For example, a blending function may be selected that casts curved rays through the blending region between a first camera pair's boundary surface (defining a region in which it is providing images or 3D data) and a second camera pair's boundary surface (again, defining a region in which this pair is used to provide images or 3D data). By utilizing curved rays instead of the conventional linear cast rays from the cameras (aligned with a single viewing direction), smooth blending can be achieved between the viewing parameters of the stereo rigs (two or more camera pairs) in the transition area, which can be defined by the animator or user. The curved rays may be defined or based on a higher degree polynomial function.

Moreover, by allowing the user to choose and then tune the blending function, the method (and system) provides artistic control over influence of each rig (or camera pair) in the composition of the 3D data. The method avoids depth distortion by addressing monotonic behavior of the stereoscopic disparity function. In addition, the composition techniques described herein readily fit into a production pipeline of a typical animation studio. Particularly, the proposed composition methods, including user-tuned blending of 3D data from each rig, streamlines a stereo artist's workflow by eliminating the need for a final manual and, often, time-consuming assembly or compositing process. The proposed composition methods offer enhanced control over the stereo properties of the scene. This added control allows application of multi-rigging to a greater range of shots including shots with continuous geometry, e.g., the ground plane, that would be visible in conventional multi-rigging setups and including shots where moving geometry passes through different stereo rigs throughout the course of the shot (e.g., a character walks toward the camera or from the background region to the foreground region).

FIG. 1 illustrates one example of a conventional multi-rigging system or setup 100 for generating a stereoscopic image 134 (e.g., a frame of a 3D movie or the like). As shown, a scene or shot is being modeled for imaging by a first camera pair or rig 110 with left and right cameras 112, 114 and a second camera pair or rig 120 with left and right cameras 122, 124. The scene or shot is prone to waste or wasted space 108 due to the large distance or space between foreground and background objects or elements. Hence, there is a desire to reduce this waste 108. Also, it is artistically desirable to set differing camera settings or stereoscopic parameters for the foreground and background objects of the shot or scene such as to provide more volume for foreground objects and less for background objects.

To this end, a first pair 110 of virtual cameras 112, 114 is provided and configured with settings or parameters suited or chosen for objects at or in front of (nearer to the cameras 112, 114) a foreground plane or boundary 111. Further, a second pair 120 of virtual cameras 122, 124 is provided with settings or parameters suited or chosen for objects at or behind (further from cameras 122, 124) a background plane or boundary 121. A foreground object 102 has been modeled and positioned a distance, $d_1$, in front of background object 103. When linear rendering techniques with a single pair of virtual cameras are used, rendering of the scene will result in a large portion of the distance, $d_1$, being "wasted" in the sense that it uses up the storytelling depth (such as 60 to 80 pixels or the like) available for rendered objects while no additional objects are present in the space.

To eliminate or reduce this waste 108, the system 100 uses multi-rigs with two rigs 110, 120 shown to capture and render stereoscopic images of the foreground and background images 102, 103, respectively. These rendered images are then passed to a compositing tool 130 so that the stereoscopic images from the first and second camera pairs 110, 120 can be combined by removing the wasted space 108 between the foreground and background planes 111, 121. Such compositing with tool 130 may simply involve removing all or a portion of the space 108 to produce a multi-rig stereoscopic image 134. However, discontinuities or other visual artifacts may be produced by this compositing such as when a base plane/floor or other object extends over the foreground and background planes 111, 121. For example, both rigs 110 and 120 may use linear depth rendering or ray casting to capture 3D data for the objects 102, 103, and the compositing with tool 130 of such 3D data may not match perfectly at the boundaries or transition between regions defined by boundaries 111 and 121.

Figure 2:
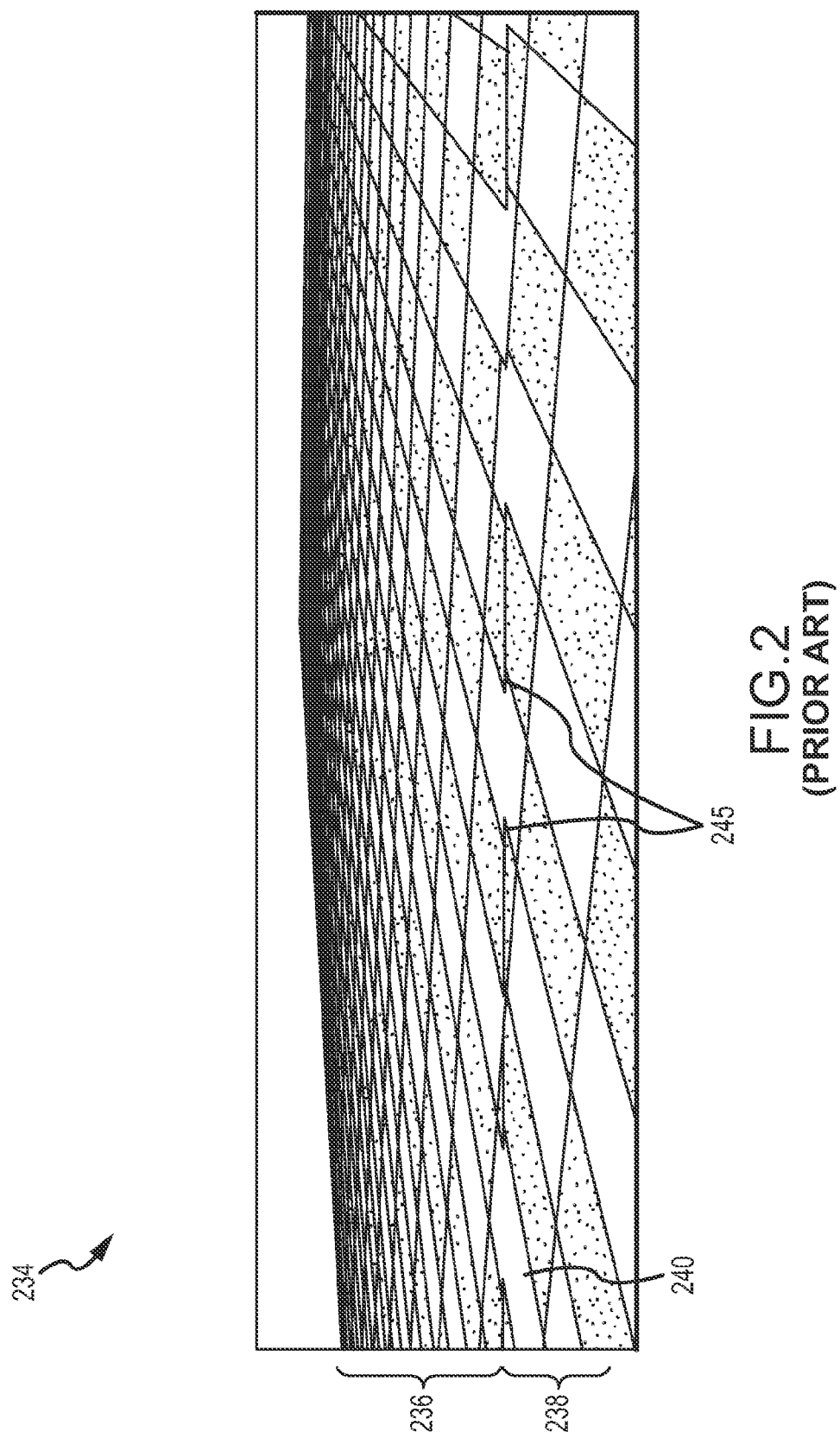
FIG. 2 shows an exemplary output of the system (or method) of FIG. 1 showing discontinuities that may be present when a base plane or flooring or other component(s) extends between the two regions of the shot/scene captures by the two rigs or camera pairs.

FIG. 2 illustrates an example of a simple stereoscopic image 234 output from a multi-rig setup such as the system 100 of FIG. 1. As shown, the image 234 is the result of combining images 236, from a rig (such as rig or camera pair 120) operated to capture 3D data for background images, with images 238, from a rig (such as rig or camera pair 110) operated to capture 3D data for foreground images. The images 236, 238 include a base plane shown as a checked pattern on a floor or planar surface, and wasted space may have been removed (such as so many pixels of depth between a foreground and a background region). At a transition region 240, the two images 236, 238 are mated together, and, as shown at 245, a number of discontinuities are created or present in the final composited image 234. In the past, animators often avoided use of multi-rigging for certain shots, such as those with objects extending between the foreground and background, and limited use of multi-rigging to shots more suited to the compositing provided by the system 100 such as shots with a character in the foreground and significant space to background objects.

Figure 3:
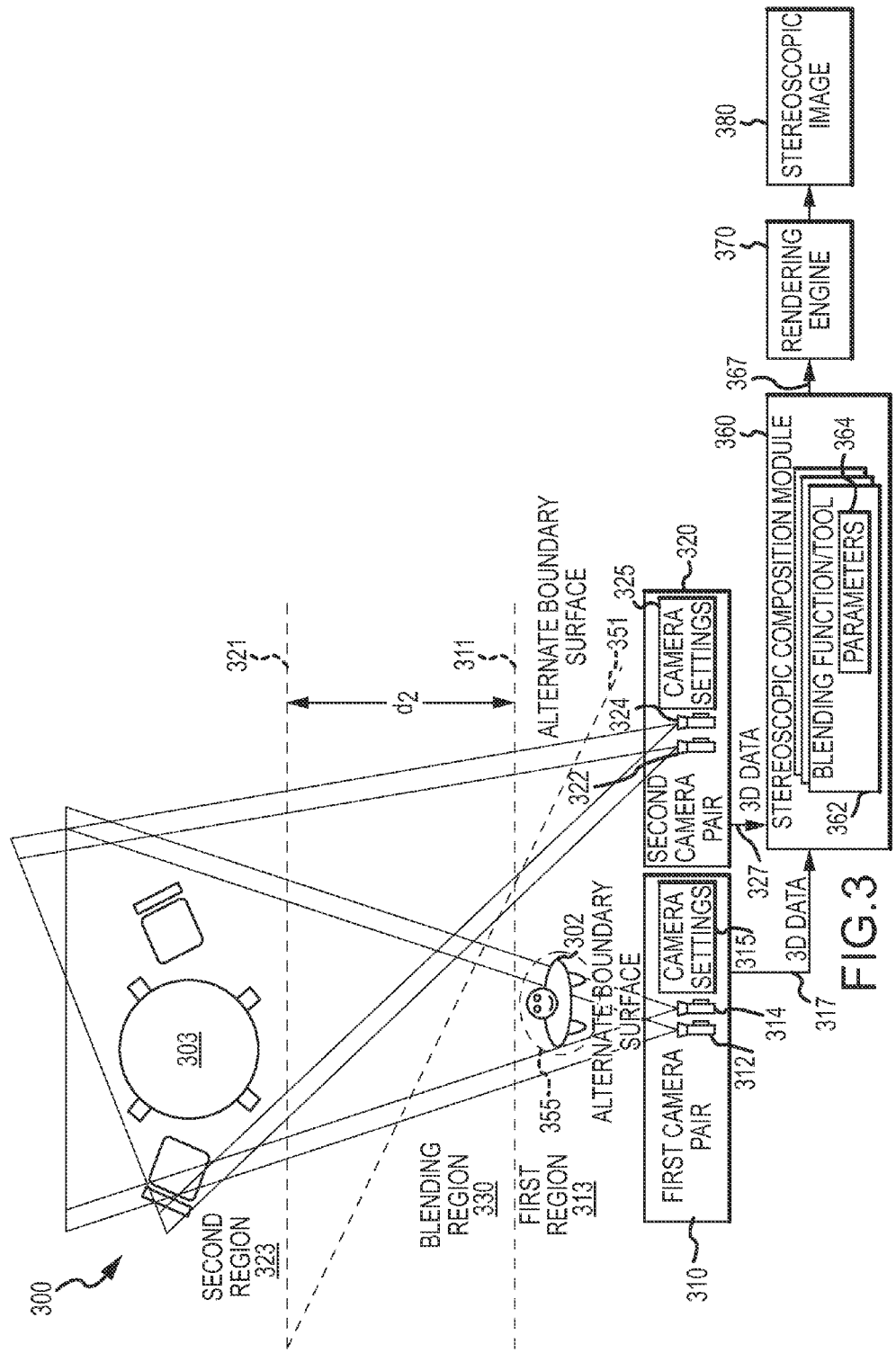
FIG. 3 illustrates a functional block drawing of a system for stereo composition using multiple camera rigs and a blending function or module for smoothly combining 3D data from each camera rig.

In contrast to system 100, FIG. 3 illustrates a system 300 configured for use in producing 3D or stereoscopic images 380 with enhanced blending of 3D data or images from two or more rigs or pairs of virtual cameras. As shown, the system 300 includes a first pair 310 of cameras 312, 314 and a second pair 320 of cameras 322, 324, with two pair shown only as an example with the techniques described herein being useful with two, three, four, or more pairs of cameras. The use of differing camera pairs allows an animator or operator of system 300 to define stereoscopic or camera settings 315, 325 independently or separately for each camera pair 310, 320, such as to achieve more volume for foreground regions or objects or achieve other artistic goals.

As with the system 100, the system 300 is being used to create 3D images using one or more modeled foreground objects (e.g., an animated character or 3D model) 302 and one or more background objects 303 spaced apart from the foreground objects 302. The first camera pair 310 may have its settings 315 set to suit the foreground object 302 while the second camera pair 320 may have its settings 325 to suit the background object 303. Further, though, the system 300 is configured such that the animator or operator may set or select surfaces for use in defining regions (or depth ranges) where each camera pair will be dominant or more important. These surfaces/boundaries then also act to define a blending region in which 3D data from each camera pair is blended or combined in a continuous manner to control or even eliminate discontinuities.

As shown, the system 300 has boundary surface 311 that is used to define a first region 313 in the shot or scene in which the first camera 310 will be used to capture 3D data (e.g., for the foreground object 302) 317 that is provided to a stereoscopic composition module 360. Also, a second boundary surface 321 is defined that is spaced apart a distance, $d_2$, away from the first boundary 311. The second boundary surface 321 defines a second region 323 in which the second camera pair 320 is used to obtain 3D data 327 that is also provided to the composition module 360 for processing with 3D data 317 from the first rig 310.

The surfaces 311, 321 are shown to be planar and also to be generally orthogonal to the depth or Z-axis for the camera pairs 310, 320. However, this is not a requirement, and FIG. 3 shows a first alternate boundary surface 351 that is transverse to but not orthogonal to the depth or Z-axis of the camera pair 310 (e.g., defines a first region or volume 313 that is triangular in cross sectional shape rather than rectangular in shape). In other cases, the boundary surface for a camera's data capture region (such as region 313) may be curved in cross sectional shape such as to allow a camera pair (such as pair 310) to be used to capture 3D data for a particular modeled object (such as object 302) or to otherwise particularly define a volume within the modeled scene or shot for collection of 3D data (data 317 and/or 327) provided to the stereoscopic composition module 360.

To avoid wasted space represented by the distance, $d_2$, between boundary surfaces 311 and 321 (or 351/355 and 321 in alternate embodiments), the 3D data 317, 327 for the first and second regions 313, 323 associated with camera pairs 310, 320, respectively, are blended together by the composition module 360, e.g., prior to rendering. To this end, the module 360 includes a blending tool or function 362 that functions to blend the data 317 and 327 in a continuous manner such that the combined 3D data 367 for the shot/scene has no discontinuities in the transition between boundary surfaces 311, 321.

The blending function 362 may be selected by the operator or user of system 300 such as to provide C0 or C1 continuity. The user or operator may also tune operation of the blending function 362 to achieve a particular artistic effect, such as by setting or choosing function parameters 364 used in blending the 3D data 317, 327. The particular blending function 362 is not limiting to the system 300 as long as the blending is smooth between objects and also is monotonic in stereoscopic depth (e.g., function 362 chosen such that background objects 303 never appear to a viewer in image 380 to be in front of the foreground images 302).

The blending tool 362 functions, through the blending region 330, to combine left eye images from camera 312 in first region 313 with left eye images from camera 322 in second region 323, and, likewise, to combine right eye images from camera 314 in first region 313 with right eye images from camera 324 in second region 323. Exemplary blending functions that may be used to provide function/tool 362 to combine 3D data 317, 327 are discussed in more detail below to provide at least C0 continuity in the transition between the first and second regions 313, 323. In a typical embodiment, the blending function 362 may be a called routine that is used to determine depth of an object in the blending region 330 and/or the disparity to assign to the object (or portions of the object).

Once the 3D data 317, 327 is combined with blending by function/tool 362 in the blending region 330, the output 367 is provided to a rendering engine 370 for rendering together or at one time (rather than separately and prior to compositing as in system 100). The rendered image 380 is then available for display or projection with a 3D display device or projection system.

It will be understood that FIG. 3 (and also FIG. 5) shows and was described as including a setup for multi-rigs in which each pair of cameras is arranged as the left camera of the first stereo rig, the right camera of the first stereo rig, the left camera of the second stereo rig, and so on. This is conceptually accurate for the procedures discussed herein. However, many embodiments or systems would be arranged or configured by the user/artist differently such as the left camera of the first stereo rig, the left camera of the second stereo rig, the right camera of the first stereo rig, and the right camera of the second stereo rig as this may be more practical for creating useful 3D data for use in seamless blending (as described throughout this description).

Figure 4:
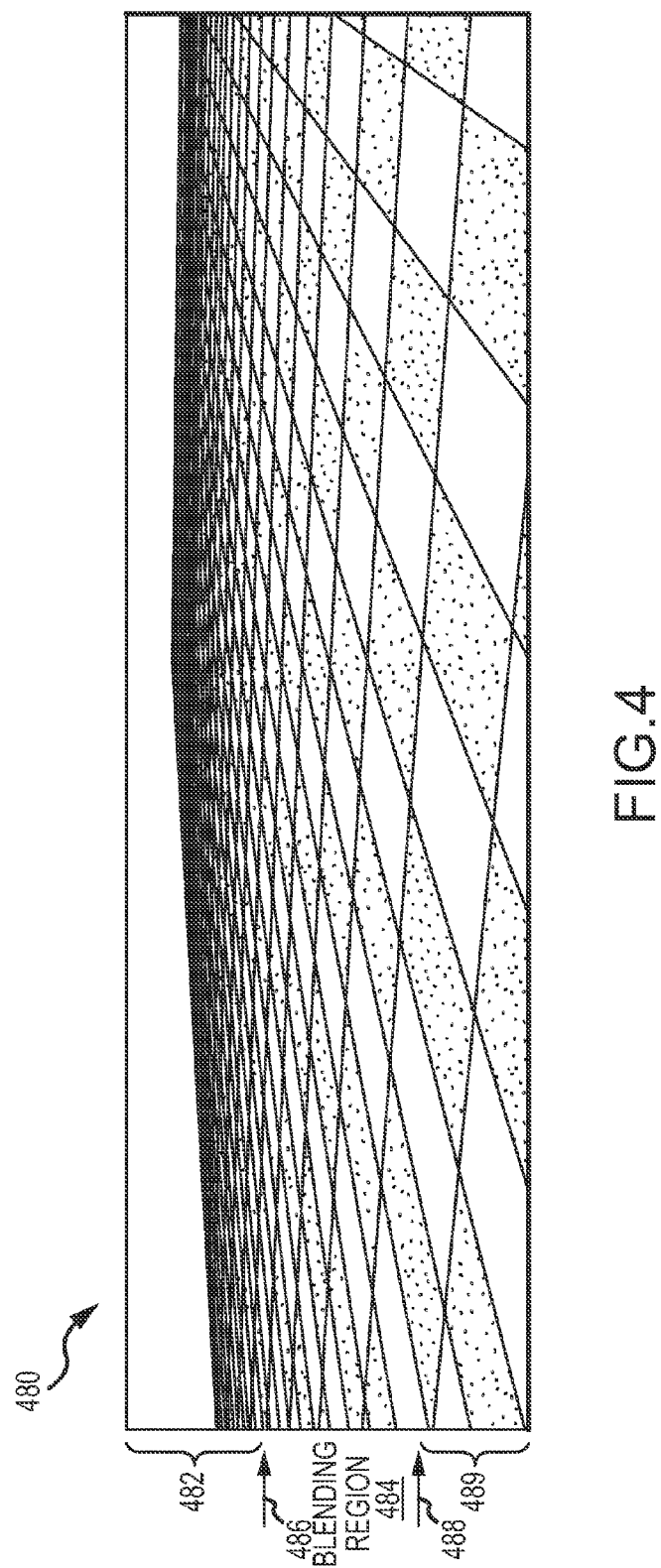
FIG. 4 shows an exemplary output of the system (or method) of FIG. 3 showing that no discontinuities are present in a displayed stereoscopic image produced by the blending function.

FIG. 4 illustrates a displayed stereoscopic image 480 such as the image 380 produced by system 300. As shown, the image 480 includes a background layer or image 482 and a foreground layer or image 489. Further, a blending or transition region 484 is shown between the images 482, 489 as defined by transitions 486, 488 associated with boundary surfaces defining first and second regions for which camera pairs/rigs collected 3D data (e.g., background and foreground regions of a scene or shot). As can be seen, the modeled scene/shot is similar to that of FIG. 2, but use of a blending function such as function/tool 362 has been used to provide smooth blending without discontinuities.

The process of generating or creating stereoscopic images (e.g., left and right eye image pairs or image streams (or primary and alternate eye image pairs)) using the blending functions or techniques will typically be implemented through the use of a computerized workstation with associated software, hardware, and memory for storing animated models/image levels (e.g., animated objects or image frames or other 3D data from cameras or multiple rigs that are ready for rendering), blending functions/module, and resulting image streams. In some implementations, the primary and alternate eye images may be used in combination to provide stereographic images that may be stored, transmitted, and/or displayed or projected using digital communication networks, compression techniques, and any of a number of conventional 3D-capable display/projection devices. Hence, before discussing specific implementations of processes implementing the blending techniques between multiple rigs, it may be useful to describe representative networks, computer systems, storage devices, software, and other tools useful for implementing some embodiments of a stereoscopic composition system.

Figure 5:
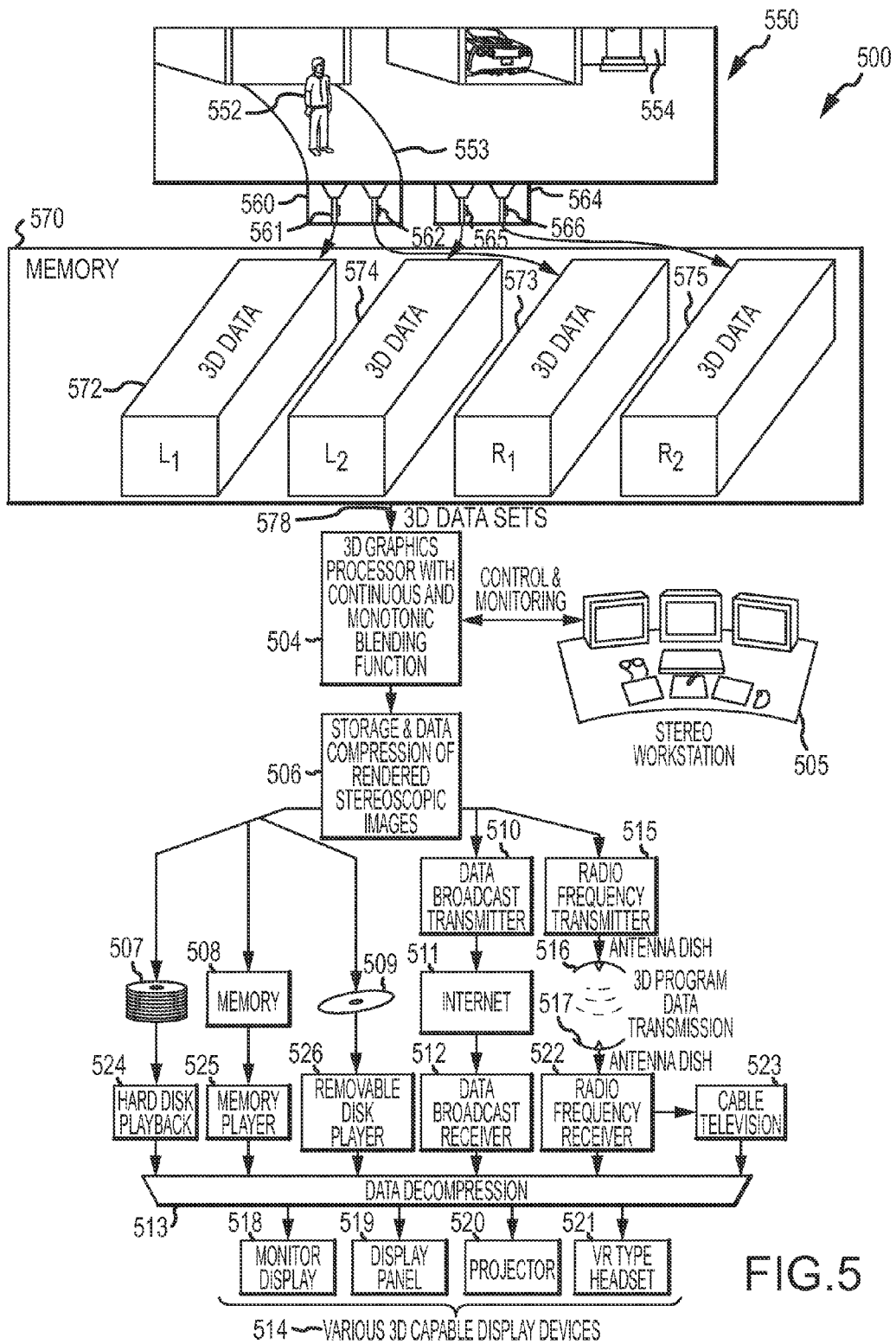
FIG. 5 is a functional block drawing of a stereoscopic or 3D system for performing stereoscopic composition and for displaying stereoscopic images.

FIG. 5 illustrates a representative stereoscopic image generation and distribution system 500 that may be used by an animator, stereographer, or the like to produce stereoscopic images, e.g., left and right images or frames of an image stream with unique depth effects by blending 3D data 578 from multiple camera rigs 560, 564. The system 500 includes content 550 (e.g., modeled scenes/shots and/or animated frames ready for rendering) with foreground objects 552 (such as characters, framing elements, and the like), background objects 554 (e.g., objects behind the foreground objects such as other characters, landscape elements, and the like), and elements/objects 553 extending between background and foreground spaces/volumes (or other camera-targeted regions of a shot/scene).

The content or animated/modeled scene 550 is filmed or rendered based upon position and other settings or parameters (such as lens setting, axis, toe in, and the like) of at least two pairs 560, 564 of virtual cameras 561 (first left camera), 562 (first right camera), 565 (second left camera), and 566 (second right camera). The content or 3D data captured by or received from the camera pairs 560, 564 is stored in memory 570 as 3D data sets associated with each camera of the rigs 560, 564 as shown with a 3D data set 572 associated with the first left camera 561, a 3D data set 574 associated with the second left camera 565, a 3D data set 573 associated with the first right camera 562, and a 3D data set 575 associated with the second right camera 566. The 3D data is passed as shown at 578 to a 3D graphics processor 504 for rendering after using a continuous and monotonic blending functionality. The 3D data 578 may be thought of as volumetric data for the shot/scene 550 captured by each camera, which may be left and right eye images/frames or other data useful in creating stereoscopic images (e.g., images 506), but could be any 3D format sufficient for use in blending.

The system 500 includes the 3D graphics processor 504 (e.g., one or more processors or CPUs running graphics and other software/algorithms described herein) to first blend the left and right 3D data from each camera of each rig using a blending function (e.g., as described above with regard to FIGS. 3 and 4 or below in a particular example of a blending function). For example, the 3D data 572 is combined with the 3D data 574 using the blending function in the blending region, which may be defined by a user operating the workstation 505 to define boundary surfaces for the rigs 560, 564 (e.g., a first camera region in which the rig 560 is used or important and a second camera region in which the rig 564 is used, and these may be the foreground and background spaces/volumes of shot/scene 550 or other regions). After the 3D data 578 is blended with the blending function, the 3D graphics processor 504 may render the image (and perform, in some embodiments, other functions used to create an animated work such as modeling, animation, compositing, and the like). The processor 504 functions to render stereoscopic images as shown at 506 and store them in memory 570 or devices 507, 508, 509 (or other storage devices). Note, the specific blending functions or algorithms implemented by the processor 504 are described in detail below.

Control and monitoring of the operation of the processor 504 is performed via a stereo workstation 505, and a user (e.g., an animator or a stereographer) may use the workstation to operate or interact with the 3D graphics processor 504 (e.g., to select a blending function and to tune it to achieve certain results such as by setting function/algorithm parameters), editing modules and monitors, and/or other film processing tools such as may be used in animated work productions. In the illustrated exemplary system 500, the processor 504 is implemented and controlled by a user working at a stereo workstation 505 at which the user may access an interactive user interface and image processing tools and may, in some embodiments, control and monitor the results of the processor 504 (e.g., as it runs to select and adjust depth and/or disparity relationships of objects of the 3D data sets 572, 573, 574, 575 being created from content 550 to preserve depth and to assure smooth blending without discontinuities at transitions between 3D data from differing rigs 560, 564). The blending and other functions implemented by the processor 504 may be performed by one or more processors/controllers.

Moreover, these functions can be implemented employing a combination of software, hardware and/or firmware taking into consideration the particular requirements, desired performance levels, and the like for a given system or application.

The workstation 505 may include multiple monitors, three-dimensional glasses, and one or more user input mechanisms such as a keyboard, a mouse or trackball, drawing tablet(s), and a drawing pen. The workstation 505 may also include a processor that provides signals to the monitors, controls the visual displays at these monitors, and receives and processes user inputs provided to the system via the user input mechanisms, e.g., controls the interactive interface or the like. The processor may provide, in conjunction with the three-dimensional glasses, when the glasses are synchronized to a signal from the processor, a three-dimensional image at an application monitor, which is updated to allow the user to observe changes in the depth or placement of various objects within the stereoscopic images 505. In some embodiments, an interface may be provided to allow an operator to select one or more objects in a scene or animated content 550 and to assign a particular camera rig or pair of cameras to that object or objects and also to define camera parameters or settings for each rig 560, 564.

The stereoscopic images (e.g., primary eye images and alternate eye images produced by blending the 3D data from the multiple rigs using continuous blending algorithms) may be stored via storage and data compression 506 performed by processor 504. The images or files may be stored on hard disk, on tape, or on any other form of data storage. In the interest of conserving space on the above-mentioned storage, the digital data of the images may be compressed; otherwise, file sizes can become large especially when dealing with a full-length animated work or digitized live action film. Data compression also may be desired when the information passes through a system with limited bandwidth, such as a broadcast transmission channel.

The stereoscopic images 506 after blending and rendering by processor 504 and/or workstation 505 can be stored in many forms. The image data can be stored on a hard disk 507 such as for hard disk playback 524, in removable or non-removable memory 508 such as for use by a memory player 525, or on removable disks 509 such as for use by a removable disk player 526, which may include but is not limited to digital versatile disk (DVD) players. The stereoscopic images can also be compressed into the bandwidth necessary to be transmitted by a data broadcast receiver 510 across the Internet 511 or other digital communications network, and then received by a data broadcast receiver 512 and decompressed (e.g., via data decompression 513), making it available for use via 3D-capable display devices 514. Similar to broadcasting over the Internet 511, the primary and alternate eye images (or stereoscopic images) created by the methods described herein can be transmitted by way of electromagnetic or RF (radio frequency) transmission by a radio frequency transmitter 515. This includes direct conventional television transmission as well as satellite transmission employing an antenna dish 516. The images can also be transmitted by satellite and received by an antenna dish 517, decompressed, and viewed on a monitor display 518, possibly incorporating a cathode ray tube (CRT), a display panel 519 such as a plasma display panel (PDP) or a liquid crystal display (LCD), a front or rear projector 520 in the home, industry, or in the cinema, or a virtual reality (VR) headset 521. If the stereoscopic images are broadcast by way of RF transmission, the receiver 522 may feed a display device directly. Another use for the stereoscopic images produced by the inventive processes is distribution via cable television 523.

Figure 6:
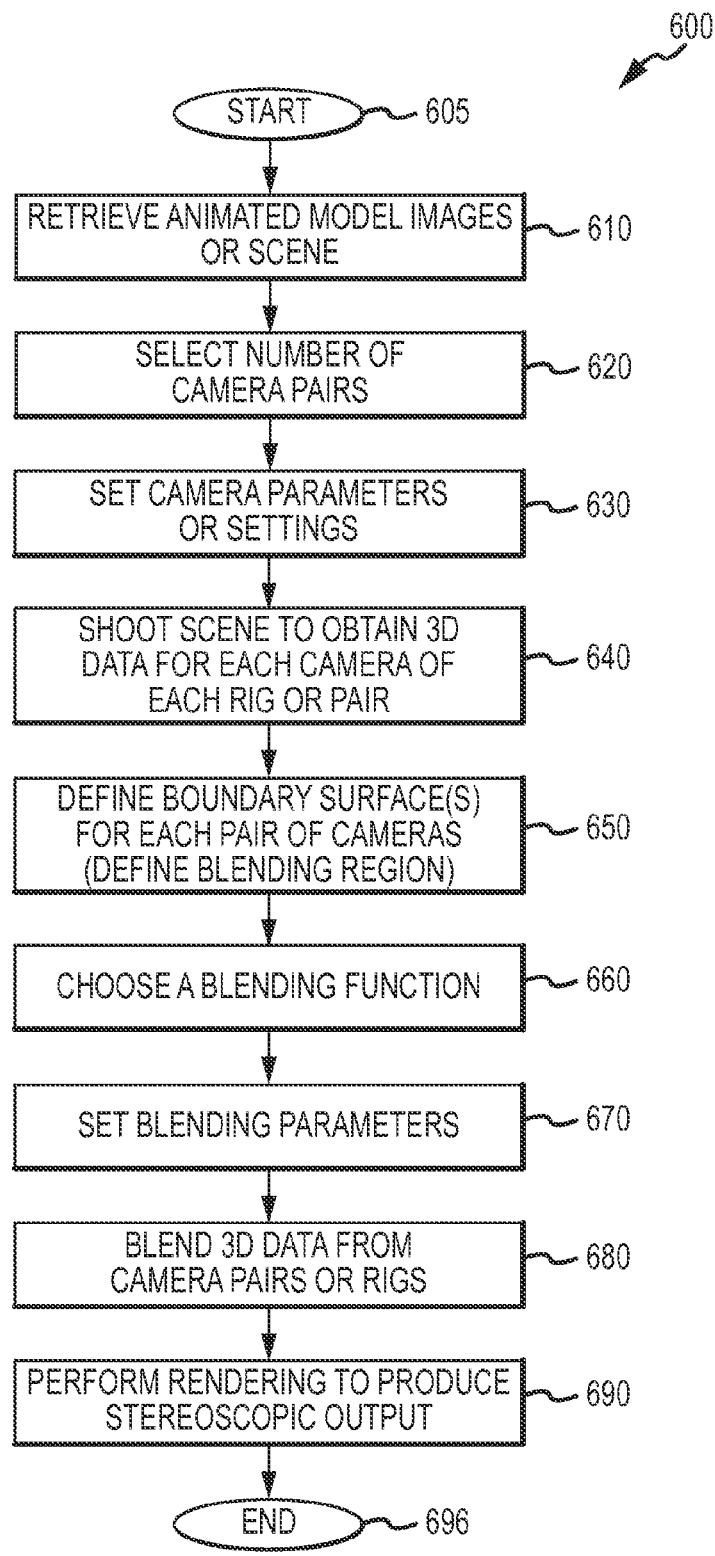
FIG. 6 is a flow chart of a method of performing stereoscopic composition using a blending function to blend or combine 3D data from two or more camera rigs prior to rendering to produce stereoscopic images or output (e.g., for later display to viewers)

FIG. 6 illustrates a method 600 for creating stereoscopic images using blending techniques that are monotonic in stereoscopic depth and provide a continuous curve through a blending region between combined 3D data. The method 700 typically is implemented in a computer system or network such as, but not limited to, that shown in FIG. 5, and, in some cases, all or portions of the method 600 may be implemented with software, programming, or code adapted to cause a computer or similar device to perform particular functions and stored in memory or on magnetic media devices (e.g., non-transitory storage device that is then accessed or read by a computer processor to cause the computer to perform one or more of the steps of the method 700.

As shown, the method 600 starts at 605 such as by loading appropriate composition, blending, rendering, user interface, and other software (such as 3D graphics applications) onto a workstation or computer system. At 610, the method 600 continues with creating or retrieving from memory images of animated models or an animated shot/scene (e.g., modeled and rigged characters and other elements using CG processes or the like). At 620, a stereographer or operator of a workstation may interact with a user interface to select a number of rigs or camera pairs to use in producing a stereoscopic image, and this number may be 2, 3, or more rigs (i.e., "multiple rigs"). For example, a first rig may be used for foreground images, while a second rig may be used for shooting objects in the background region or space of the modeled shot/scene.

Then, at 630, the operator may define or set operating parameters or settings for each of the camera rigs. For example, this may include defining interaxial distances and convergence angles, and the use of multiple rigs allows differing camera settings to be used for differing portions (differing camera pair regions or spaces in a shot) such as to provide more depth for a foreground object than a background object. At 640, the method 600 continues with shooting the scene with the multiple rigs selected at step 620 to obtain 3D data for each of the virtual cameras of each rig or camera pair (e.g., see FIG. 5 for input to composition tool/blending function in the form of a 3D data set for each camera).

The method 600 then includes defining boundary surfaces at 650 for each pair of cameras so as to define a blending region(s) between the rigs. For example, a circular (or tubular) boundary surface may be used to encapsulate a foreground object and define a first region associated with a first camera pair or rig. Another example would be to define a near boundary surface that may be planar or curved to establish a foreground region and to also define a far boundary surface that may be planar or curved to establish a background region, with the foreground region being associated with one of the camera pairs, and the background region is associated with another one of the camera pairs. The space or volume between the near and far boundary surfaces defines the blending region in which the blending function is applied to provide smooth transition (no discontinuities) between the 3D data of the two (or more) camera rigs.

At step 660, an operator may choose a blending function from a plurality of blending functions, with each being monotonic in stereoscopic depth and also providing continuity at transitions. For example, the operator may select a non-linear rendering function such as one of the non-linear depth rendering processes taught in U.S. Pat. No. 8,228,327, which issued on Jul. 24, 2012 and which is incorporated herein by reference in its entirety. This may be useful for achieving C1 continuity, while, in other applications, linear depth rendering or ray casting may be used in the blending region to combine 3D data from left and from right cameras of two or more rigs so as to provide C0 continuity. In other cases, the blending function may include use of a lookup table to preserve depth while also providing continuous curves in the blending region and at transitions/defined boundary surfaces in a shot/scene. At 670, the operator may choose to use default parameters for the blending function or may set or tune blending parameters so as to provide desired artistic results in the output of the composition method 600.

The method 600 continues at 680 with using the tuned blending function to blend the 3D data from the camera pairs together. For example, the 3D data from a left camera of a first rig may be combined using the blending function in the blending region with the 3D data from a left camera of a second rig (and similar processing with the 3D data from the right cameras from each rig). Once the 3D data has been blended or combined with the blending function, the method 600 may continue at 690 with rendering of the blended data to produce a stereoscopic output or images. The stereoscopic images may then be stored for later use, may be displayed with a 3D display system, and so on. At 696, the method 600 ends (or it may continue by returning to step 610 to process further shots or scenes into stereoscopic images with the same or differing blending functions and the same or differing multiple camera rigs).

With the above description understood, it may now be useful to describe one exemplary, but not limiting, curvilinear blending function that may be used to implement stereo compositing. A goal of using this blending function is to provide artistic freedom and eliminate the need for a clear separation between objects rendered with differing stereo parameters, which allows usage of multi-rigging in nearly any CG scene. Briefly, the method uses a type of volumetric data (e.g., "3D data" discussed above) known as deep images and casting curved rays through these deep images.

In one implementation, deep images are utilized in the blending function. A deep image represents a rendering from a camera with the viewing direction aligned with the Z-axis and with the camera/image plane aligned with the XY plane. A deep image may be given as a N×M array of deep pixels $P_{n,m}$. Each deep pixel is a collection of samples sorted by their depth: $P_{n,m} = \{(c_0, a_0, z_0), (c_1, a_1, z_1), \ldots\}$ and $z_0 < z_1 < \ldots$, where $c_i$, $a_i$, $z_i$ (i N) represents the sample's color, opacity, and z-depth components, respectively. A complete set of all pixels from the same height m forms up a slice $S_m$: $S_m = \{P_{0,m}, P_{1,m}, \ldots, P_{n,m}\}$. The deep image function I can be defined as a map from a deep pixel and bounding z depth range, $[z_{start}, z_{end}]$, to the set of samples of this deep pixel: $I(n, m, z_{start}, z_{end}) = \{((c, a, z) \in P_{n,m} | z_{start} \leq z \leq z_{end}\}$. To insure that I has logarithmic time complexity, the samples are sorted by their z-values in each deep pixel.

Figure 7:
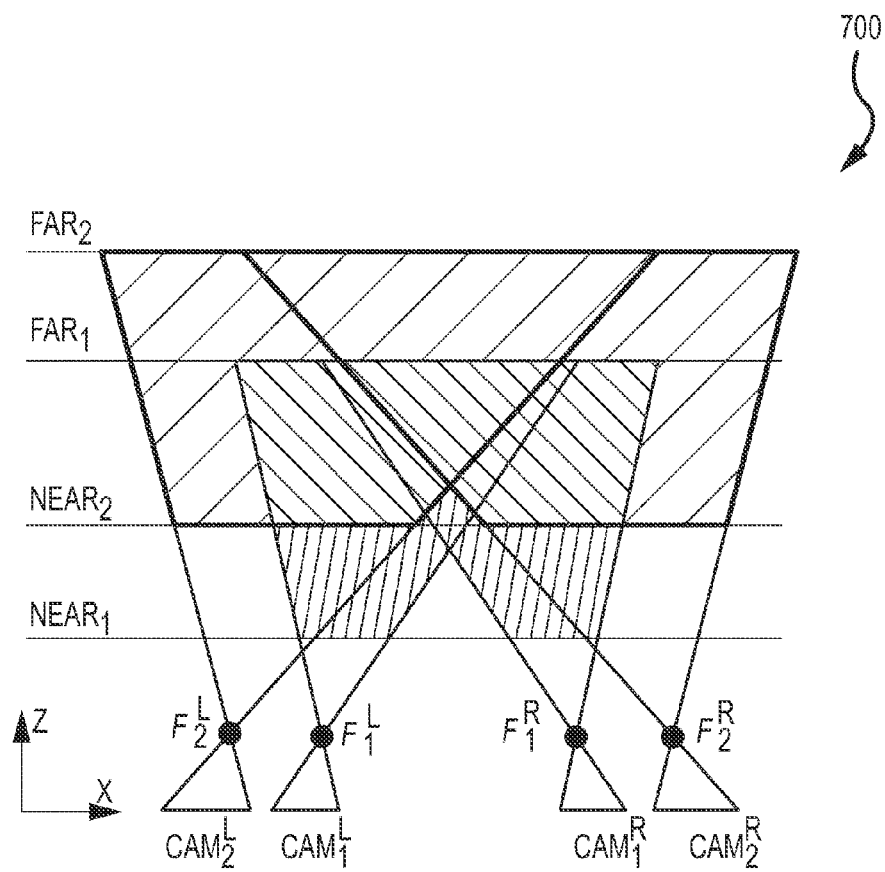
FIG. 7 is a graph showing establishment of boundary surfaces to define regions of an animated scene associated with differing camera pairs or rigs and to define a blending region between adjacent ones of these camera rig's boundary surfaces.

The discussion of the deep compositing algorithm can begin by providing a problem definition. The input (or 3D data) includes deep images that have been produced by rendering the scene from all the cameras in the multi-rig, such as cameras 312, 314, 322, and 324 of the camera pairs 310, 320 in system 300 of FIG. 3. Although the deep compositing algorithm trivially extends to rigs with any number of stereo camera pairs, for the sake of simplicity, the algorithm may be described for the case of a multi-rig with two stereo pairs of cameras: $Cam^L_1/Cam^R_1$, and $Cam^L_2/Cam^R_2$ with focal points at $F^L_1$, $F^R_1$, $F^L_2$, and $F^R_2$ (see the graph 700 of FIG. 7). The cameras' corresponding deep images are given by the deep image functions: $I^L_1$, $I^R_1$, $I^L_2$, and $I^R_2$. As in a typical multi-rig setup, the user-specified interaxial distances and HIT (image plane shift) values of the cameras are set to insure that $Cam^L_1/Cam^R_1$ produces a specific stereoscopic depth effect for foreground objects and $Cam^L_2/Cam^R_2$ outputs a different desired stereoscopic depth effect for background objects. However, the first stereo camera rig's rendering volume, bounded by $near_1$, $far_1$ clipping z-planes, may overlap with the second stereo rig's volume, bounded by the $near_2$, $far_2$ z-planes, and, consequently, forms the common region between $near_2$ and $far_1$ z-planes.

One goal is to produce two 2D images that are the composites of left and right views. Conceptually, then, it is desirable to merge three volumes (for each view): (1) the $near_1$-$near_2$ region, solely controlled by the first pair of the deep images; (2) $near_2$-$far_1$ blending region between the deep images; and (3) $far_1$-$far_2$ region, derived from the second pair of deep images. It is desirable that the overlapping region serves as a seamless transition from the first pair of the deep images to the second. In addition, the user or operator may in some embodiments be provided intuitive controls to art-direct the behavior in the blending region by prescribing influence for each pair of cameras. The two pairs of the cameras are consistent in stereo depth-wise, i.e., the stereo disparity of $Cam^L_1$, $Cam^R_1$ at the end of the first region (at $near_2$) is less than the stereo disparity of $Cam^L_2$, $Cam^R_2$ at beginning of the last region (at $far_1$). Without losing generality, construction of the left view composite is derived, and the right view is produced analogously.

The conventional ray-casting can be generalized, where viewing direction coincides with the direction of straight casting rays. For each pixel (i, j) of the output 2D image, color $c_{i,j}$ is accumulated along ray $l_{i,j}$ in the viewing direction as: $c_{i,j} = a_0 c_0 + (1-a_0) a_1 c_1 + (1-(1-a_0) a_1) a_2 c_2 + \ldots$ (Eq. 1), where $(c_0, a_0), (c_1, a_1), (c_2, a_2), \ldots$ are respectively opacity and color components of samples located along $l_{i,j}$ and sorted by their z-depth components, $z_0, z_1, z_2, \ldots$. The viewing direction is not well defined since viewing directions are different for the deep pixels (i, j) in the first and second deep images. Thus, a key challenge of solving Eq. 1 is to define $T_{near1,far2}$, the set of samples, i.e. triplets (c, a, z), along a casting ray $l_{i,j}$ between $near_1$ and $far_2$: $T_{near1,far2} = \{(c_0, a_0, z_0), (c_1, a_1, z_1), (c_2, a_2, z_2), \ldots\}$ (Eq. 2), where $near_1 < z_0, z_1, z_2, \ldots < far_2$.

$T_{near1,far2}$ can be subdivided into three subsets $T_{near1,near2}$, $T_{near2,far1}$, $T_{far1,far2}$, based on $near_1$, $near_2$, $far_1$, $far_2$ z-depths. Since the region bounded by $near_1$ and $near_2$ is controlled solely by the first deep image, $l_{i,j}$ can be represented as a straight line segment aligned with the viewing direction of deep pixel (i, j) of this deep image. Consequently, the samples can be obtained by locating the deep pixel's samples with z-components between $near_1$ and $near_2$, i.e. $T_{near1,near2} = I^L_1(i, j, near_1, near_2)$. Analogously in the $far_1$-$far_2$ region, $T_{far1,far2} = I^L_2(i,j, far_1, far_2)$. Thus, Eq. 2 can be rewritten as: $T_{near1,far2} = I^L_1(i, j, near_1, near_2) \cup T_{near2,far1} \cup I^L_2(i, j, far_1, far_2)$ (Eq. 3). Thus to solve we need to find $T_{near2,far1}$ set of samples.

With regard to shape definition of casting ray, one possible alternative for defining shape of $l_{i,j}$ in the blending region is to represent it as a straight line segment that connects the end of $l_{i,j}$ portion in the $near_1$-$near_2$ region and the beginning of $l_{i,j}$ portion in the $far_1$-$far_2$ region. Thus, a sample P on $l_{i,j}$ in the blending region can be computed using linear interpolation: $P = (1-t) C_0 + t C_1$ (Eq. 4), where $C_0$ is the intersection of $l_{i,j}$ with $near_2$ z-plane, $C_1$ is the intersection of $l_{i,j}$ with $far_1$ z-plane, t is float parameter between 0 and 1 (see graph 810 of FIG. 8A).

In order to produce believable stereoscopic visualization, it is typically desirable to take into account the disparity function, which should be monotonically increasing in the viewing direction (i.e., along the casting rays). Disparity obviously increases in the first and the last regions since each of them is solely based on a single pair of stereo cameras, and, thus, the standard stereoscopic rendering rules are applied. The main benefit of the linear definition (Eq. 4) is that it insures the monotonically increasing behavior of disparity in the blending region.

Use of linear blending function may not be suited for all applications. For example, one drawback of the linear definition of $l_{i,j}$ is that it can introduce seams on the boundaries of the blending region. To avoid that, $l_{i,j}$ is required or configured to smoothly transition between regions. To accomplish that, the shape of $l_{i,j}$ is defined based on a higher degree polynomial. Inside the blending region, $l_{i,j}$ coincides with a cubic Bezier curve that lies on the plane of the j-th slice of the deep images. To insure C0 continuity along $l_{i,j}$, the curve's first control vertex $C_0$ is placed at intersection of $l_{i,j}$ with $near_2$ z-plane. To preserve C1 continuity at $near_2$, as we transition into the blending region, the second control vertex $C_1$ is offset from $C_0$ in the viewing direction of the deep pixel of the first camera. Analogously, the other two control vertices, $C_2$ and $C_3$, are defined (see graph 810 of FIG. 8B). To enforce monotonic behavior of $l_{i,j}$ in z-direction, $C_1.z$ may be required to be less than $C_2.z$, (and, thus, the control vertices are in ascending order along z-depth).

Although the positions of the control vertices are calculated per each casting ray, the user can prescribe overall behavior in the blending region (i.e., tune the blending function by setting one or more of its parameters). For example, by specifying the ratio between lengths of $C_0C_1$ and $C_2C_3$, a user can control influence of the two stereo cameras over each other on the casting ray's shape in the blending region. Since the shape of cubic Bezier curve approaches line segment as lengths of $C_0C_1$ and $C_2C_3$ segments shrink, reducing and increasing the length of both segments let the user balance between monotonically increasing disparity and smoothness.

Actual sampling along the ray's path in the blending region is based on discretization of $l_{i,j}$ in terms of deep pixel portions, and $l_{i,j}$ is allowed to intersect $k_1$ deep pixels of the first deep image and $k_2$ deep pixels of the second deep image in the blending region. Then, $l_{i,j}$ encounters the following sets of samples in the first and second deep images respectively: $T^{(1)}_{near2,far1} = I^L_1(i, j, near_2, z_0) \cup I^L_1(i-1, j, z_0, z_1) \cup \ldots \cup I^L_1(i-k_1, j, z_{k_1-1}, far_1)$ and $T^{(2)}_{near2,far1} = I^L_2(i+k_2, j, near_2, z_0) \cup I^L_2(i+k_2-1, j, z_0, z_1) \cup \ldots \cup I^L_2(i, j, z_{k_2-1}, far_1)$, where $z_i$ ($i \in \{0, \ldots, k_1-1\}$) and $z_j \in \{0, \ldots, k_2-1\}$) are z components of intersections with the deep pixels' cones in the first and second images respectively (see graph 820 of FIG. 8C).

Although most of the length of $l_{i,j}$ is in the bounding volumes of the both images, small portions of $l_{i,j}$ adjacent to $near_2$ and $far_1$ might lie only in one of the two deep images. Technically, this would correspond to configurations where $(i+k_2)$ is greater than the horizontal resolution N of the deep image and $(i-k_1)$ is less than zero. In these cases, samples are obtained directly from the corresponding single deep image. Traversing the ray's regions that lie in the overlapping portions of the bounding volumes of the deep images, samples are collected from both images and then blended based on their location relative to $near_2$ and $far_1$.

In this process, one can ensure that advancing along $l_{i,j}$ from $near_2$ to $far_1$, the first deep image loses its influence and the second deep image gains in influence. This can be done by interpolation functions $f_1(a, z)$ and $f_2(a, z)$ that modify opacities of the samples of the first and second deep images respectively:

$$f_1(a, z_i) = \begin{cases} a \cdot \left(1 - \frac{far_1 - z_i}{far_1 - near_2}\right) & \text{if } i - k_1 \geq 0 \\ a & \text{if } i - k_1 < 0 \end{cases}$$

$$f_2(a, z_i) = \begin{cases} a \cdot \frac{far_1 - z_i}{far_1 - near_2} & \text{if } i + k_2 < N \\ a & \text{if } i + k_2 \geq N \end{cases}$$

Thus, $T_{near2,far1}$ needed for (Eq. 3) can be defined as a set of $T^{(1)}_{near2,far1}$ and $T^{(2)}_{near2,far1}$ samples with modified opacities: $T_{near2,far1} = \{(f_1(a), c, z) | (a,c,z) \in T^{(1)}_{near2,far1}\} \cup \{f_2(a), c, z) | (a,c,z) \in T^{(2)}_{near2,far1}\}$.

Although systems and methods have been described and illustrated with a certain degree of particularity, it is understood that the present disclosure has been made only by way of example, and that numerous changes in the combination and arrangement of parts can be resorted to by those skilled in the art without departing from the spirit and scope of the present disclosure, as hereinafter claimed.

In review, the described technique solves the problem of discontinuities that arise from the use of multi-rig stereo camera setups, e.g., visually noticeable discontinuity where the image from one camera pair stops and the image from the next camera pair begins. The stereo composition technique uses a collection of stereo camera pairs (two or more) and uses a blending method between the rays of these camera pairs that ensures continuity (e.g., C0 or, more typically, C1 continuity) and also monotonic depth. An advantage of use of multiple stereo camera pairs is that each camera pair can be configured by the animator/artist (user of the described technique and system) to have unique stereo parameters that can be tuned to objects in the camera pair's range (foreground, background, or a region defined by a user-defined boundary about one or more objects, and so on), whereas a single camera pair cannot be configured this way. The technique allows such multiple camera pairs while avoiding discontinuities and also avoiding the need for a compositing step required for conventional multi-rig setups.

Numerous 3D projection systems and techniques may be used to create, display/project, and view stereoscopic images formed based on the left and right (or primary and alternate) eye images or image streams produced or output by the methods and systems described herein. For example, these systems may use side-by-side techniques (e.g., head-mounted displays), 3D glasses (e.g., liquid crystal shutter glasses, linearly polarized glasses, circularly polarized glasses, compensating anaglyph glasses, or the like), autostereogram techniques, and other 3D projection and viewing equipment such as film projectors and digital projectors (such as CRT, DLP, LCD, and the like).

We claim:

1. A composition method for generating stereoscopic images, comprising:
    positioning at least first and second pairs of virtual cameras for imaging an animated scene;
    with the first and second pairs of the cameras, obtaining three-dimensional (3D) data for each of the cameras for the animated scene;
    defining a blending region by defining a first boundary surface for the first pair of the cameras and a second boundary surface, spaced a distance apart from the first boundary surface, for the second pair of the cameras, wherein the blending region comprises a space in the animated scene between the first and second boundary surfaces; and with a blending module run by a processor, processing the 3D data in the blending region to combine the 3D data from the first and second camera pairs, wherein the blending module is configured to monotonically increase the stereoscopic disparity function in a viewing direction during the processing of the 3D data, wherein the blending module combines the 3D data associated with the first and second camera pairs in a continuous manner, wherein the blending module provides C0 or C1 continuity in the combined 3D data, and wherein the blending module combines the 3D data by linearly blending, through the blending region, a 3D data set from each left camera of the first and second camera pairs and linearly blending a 3D data set from each right camera of the first and second camera pairs.

2. The method of claim 1, further comprising rendering the combined 3D data to generate stereoscopic images, wherein the animated scene includes an object extending across the first and second boundary surfaces and wherein the generated stereoscopic images are free of discontinuities in the object at transitions at the first and second boundary surfaces.

3. The method of claim 1, wherein the blending module combines the 3D data using non-linear depth blending, through the blending region, a 3D data set from each left camera of the first and second camera pairs and non-linear depth blending a 3D data set from each right camera of the first and second camera pairs.

4. The method of claim 1, wherein the first boundary surface or the second boundary surface is non-planar.

5. The method of claim 1, wherein the first boundary surface or the second boundary surface is configured to encapsulate an object in the animated scene.

6. A non-transitory computer readable medium for providing stereo composition using multiple camera rigs, comprising:

computer readable program code causing a computer to create a computer graphics (CG) modeled scene with a first rig comprising a left camera and a right camera and with a second rig comprising a left camera and a right camera, wherein the first and second rigs have differing camera settings;

computer readable program code causing the computer to retrieve a definition of a first region in the CG modeled scene associated with the first rig and a second region in the CG modeled scene associated with the second rig; and computer readable program code devices configured to cause the computer to blend 3D data sets for the left and right cameras of the first rig from the creating of the CG modeled scene with 3D data sets for the left and right cameras of the second rig, wherein the blending provides continuity between the first and second regions and is monotonic in stereoscopic depth, wherein the blending provides C1 continuity, and wherein the blending uses curved rays in a blending region between the first and second regions.

7. The computer readable medium of claim 6, wherein the curved rays are defined based on a higher degree polynomial function.

8. The computer readable medium of claim 6, wherein the blending comprises linear or non-linear depth rendering in a blending region between the first and second regions to combine the 3D data sets of the left cameras of the first and second rigs in the first and second regions, respectively, and to combine the 3D data sets of the right cameras of the first and second rigs in the first and second regions, respectively.

9. A non-transitory computer readable medium for providing stereo composition using multiple camera rigs, comprising:

computer readable program code causing a computer to create a computer graphics (CG) modeled scene with a first rig comprising a left camera and a right camera and with a second rig comprising a left camera and a right camera, wherein the first and second rigs have differing camera settings;

computer readable program code causing the computer to retrieve a definition of a first region in the CG modeled scene associated with the first rig and a second region in the CG modeled scene associated with the second rig; and computer readable program code devices configured to cause the computer to blend 3D data sets for the left and right cameras of the first rig from the creating of the CG modeled scene with 3D data sets for the left and right cameras of the second rig, wherein the blending provides continuity between the first and second regions and is monotonic in stereoscopic depth, and wherein the blending comprises linear or non-linear depth rendering in a blending region between the first and second regions to combine the 3D data sets of the left cameras of the first and second rigs in the first and second regions, respectively, and to combine the 3D data sets of the right cameras of the first and second rigs in the first and second regions, respectively.

10. The computer readable medium of claim 9, wherein the blending provides C1 continuity.

11. A stereo composition method, comprising:

providing a first pair of virtual cameras with first camera settings and defining a first region of an animated scene associated with the first pair of cameras;

providing a second pair of virtual cameras with second camera settings differing from the first camera settings and defining a second region of the animated scene associated with the second pair of cameras, wherein a blending region is provided between adjacent boundaries of the first and second regions and wherein the first region comprises a foreground space of the animated scene and the second region comprises a background space of the animated scene, with a blending function, combining 3D data from the first pair of cameras for the first region with 3D data from the second pair of cameras for the second region, wherein continuity is maintained through transitions between the blending region and the first and second regions; and operating a processor to render stereoscopic images from the combined 3D data, wherein at least one of the boundary surfaces is planar and non-orthogonal to a viewing direction in the animated scene.

12. The method of claim 11, wherein the blending function is monotonic in stereoscopic depth.

13. The method of claim 11, wherein the blending function defines one or more curves through the blending region to combine the 3D data from left cameras and from right cameras of the pairs of cameras.

14. The method of claim 11, wherein the defining of the first and second regions comprises receiving user input configuring and positionally placing one or more boundary surfaces in the animated scene.

* * * * *